(12) United States Patent
Lee

(10) Patent No.: US 7,944,990 B2
(45) Date of Patent: May 17, 2011

(54) SYSTEM AND METHOD FOR TRANSMITTING AND RECEIVING DATA IN A COMMUNICATION SYSTEM

(75) Inventor: Byeong-Si Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 12/006,499

(22) Filed: Jan. 3, 2008

(65) Prior Publication Data
US 2008/0165887 A1 Jul. 10, 2008

(30) Foreign Application Priority Data
Jan. 5, 2007 (KR) .................. 10-2007-0001373

(51) Int. Cl.
*H04L 27/00* (2006.01)

(52) U.S. Cl. ............................................. 375/295
(58) Field of Classification Search ............ 375/295, 375/316; 370/203
See application file for complete search history.

(56) References Cited

U.S. PATENT DOCUMENTS
2005/0219998 A1* 10/2005 Kumar et al. ............... 370/203
* cited by examiner

*Primary Examiner* — Sam K Ahn

(57) ABSTRACT

A system and method for transmitting and receiving data in a communication system are provided, in which upon generation of data of communication services to be transmitted to a receiver, a transmitter classifies the data according to the service types of the communication services, inserts a guard interval between the classified data of the service types, and transmits the data with the guard interval to the receiver.

12 Claims, 4 Drawing Sheets

SYSTEM AND METHOD FOR TRANSMITTING AND RECEIVING DATA IN A COMMUNICATION SYSTEM

CROSS-REFERENCE TO RELATED APPLICATION(S) AND CLAIM OF PRIORITY

This application claims priority under 35 U.S.C. §119(a) to a Korean Patent Application filed in the Korean Intellectual Property Office on Jan. 5, 2007 and assigned Serial No. 2007-1373, the disclosure of which is incorporated herein by reference.

TECHNICAL FIELD OF THE INVENTION

The present invention relates generally to a communication system, and in particular, to a system and method for transmitting and receiving data in a communication system.

BACKGROUND OF THE INVENTION

Providing high-speed services with different Quality of Service (QoS) requirements to users is an active study area for the future-generation communication system. Especially, studies are being actively conducted on supporting high-speed services by ensuring mobility and QoS to broadband wireless access (BWA) communication systems such as wireless local area network (WLAN) and wireless metropolitan area network (WMAN).

In such a BWA communication system, a receiver, for example, a mobile station (MS) receives communication services with different QoS requirements from a serving base station (BS), including services of Unsolicited Granted Service (UGS), real time Polling Service (rtPS), non-real-time Polling Service (nrtPS), and Best Effort Service (BES) types.

The most fundamental issue to communication systems is how efficiently and reliably data can be transmitted with limited resources, such as channels. To meet the demand for a high-speed communication system that can additionally process and transmit video and radio data beyond early-stage voice service, a future-generation multimedia communication system, which has recently been studied actively, seeks to increase system efficiency by use of an appropriate channel encoding scheme.

Unlike a wired channel environment, errors are inevitable due to many factors, such as multipath interference, shadowing, propagation attenuation, time-variant noise, and fading in the wireless channel environment of a communication system. The resulting information loss severely distorts transmission data, thus degrading the overall performance of the communication system. To reduce data loss and increase system reliability, error control techniques are used according to channel characteristics. A basic error control technique is to use an error correction code.

To provide communication services with various QoS levels, such as services of the UGS, rtPS, nrtPS, and BES types to users, the BWA communication system should transmit data to mobile stations without error-caused loss in a radio channel environment inherent to the communication system. However, there are no specified schemes for providing communication services with QoS ensured to users. Thus, there exists a need for a method for providing communication services with various QoS requirements to users, that is, transmitting and receiving data of various service types.

SUMMARY OF THE INVENTION

To address the above-discussed deficiencies of the prior art, it is a primary object of the present invention to address at least the problems and/or disadvantages and to provide at least the advantages described below. Accordingly, an aspect of exemplary embodiments of the present invention is to provide a system and method for transmitting and receiving data in a communication system.

Another aspect of exemplary embodiments of the present invention is to provide a system and method for transmitting and receiving data to provide communication services with various QoS requirements in a communication system.

In accordance with an aspect of exemplary embodiments of the present invention, there is provided a method for transmitting data in a transmitter in a communication system, in which, upon generation of data of communication services to be transmitted to a receiver, the data is classified according to the service types of the communication services, a guard interval is inserted between the classified data of the service types, and the data with the guard interval is transmitted to the receiver.

In accordance with another aspect of exemplary embodiments of the present invention, there is provided a method for receiving data in a receiver in a communication system, in which data including a guard interval inserted between data classified as different service types is received from a transmitter, the classified data is decoded in a decoding scheme corresponding to a coding scheme used in the transmitter, and the guard interval is eliminated from the decoded data.

In accordance with a further aspect of exemplary embodiments of the present invention, there is provided a system for transmitting and receiving data in a communication system, in which a transmitter classifies, upon generation of data of communication services to be transmitted to a receiver, the data according to the service types of the communication services, inserts a guard interval between the classified data of the service types, and transmits the data with the guard interval to the receiver, and the receiver receives the data with the guard interval from the transmitter, decodes the classified data in a decoding scheme corresponding to a coding scheme used in the transmitter, and eliminates the guard interval from the decoded data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Exemplary embodiments of the present invention provide a system and method for transmitting and receiving data in a communication system, for example, a broadband wireless access (BWA) communication system. While the exemplary embodiments of the present invention are described in the context of the BWA communication system, it is to be clearly understood that the data transmitting and receiving system and method according to the present invention are also applicable to other communication systems.

The exemplary embodiments of the present invention provide a system and method for providing a communication service efficiently to a user in a communication system that provides communication services with various QoS requirements to users. In accordance with the present invention, upon generation of data associated with communication services, a transmitter (e.g., a base station) classifies the data according to the service types of the communication service and transmits the data to a receiver (e.g., a mobile station) according to the service types. Notably, after the data classification, the base station (BS) inserts a predetermined number of bits as a guard interval between the data of different service types prior to transmission to the mobile station (MS).

To be more specific, upon generation of data for the receiver, the transmitter classifies the data into a UGS type, an rtPS type, an nrtPS type, or a BES type, inserts a predetermined number of bits such as nulling bits '0' as dummy bits between data of different service types, and transmits the data with the guard interval inserted therein to the receiver. The nulling bits can be a predetermined number of bits among bits transmitted shortly before the insertion. The receiver decodes the received data and eliminates the guard interval. The resulting improved decoding performance increases a data transmission and reception rate.

Figure 1:
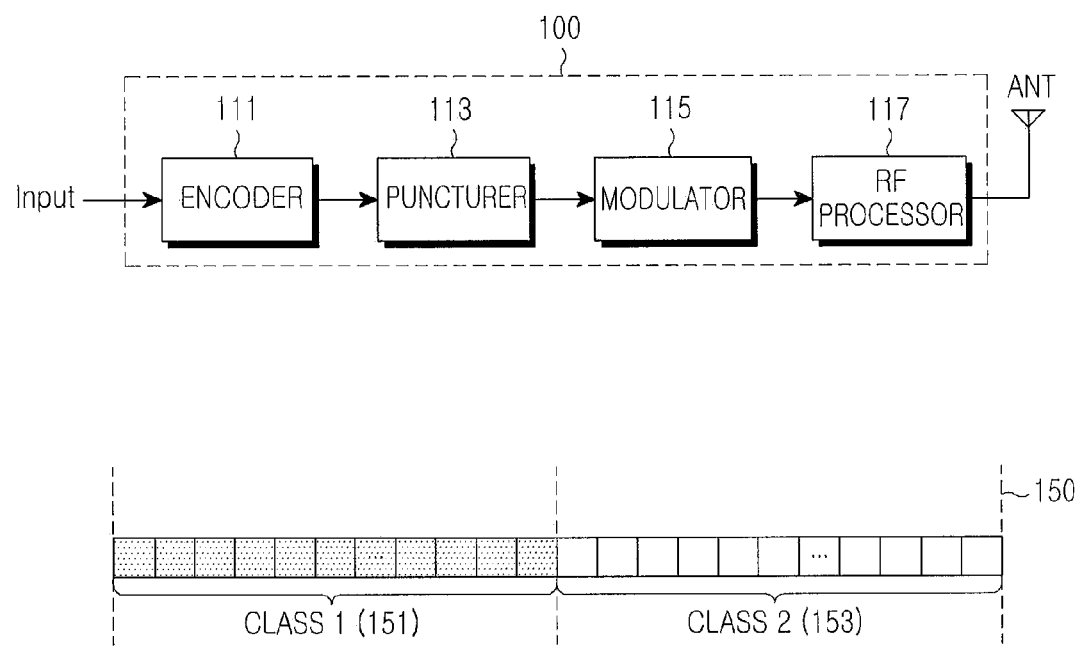
FIG. 1 is a block diagram of a transmitter in a conventional communication system.

FIG. 1 is a block diagram of a transmitter in a conventional communication system.

Referring to FIG. 1, a transmitter 100 includes an encoder 111 for encoding data to be transmitted to a receiver, a puncturer 113 for puncturing the encoded data, a modulator 115 for modulating the punctured data, and a radio frequency (RF) processor 117 for processing the modulated data to an RF signal for transmission to the receiver.

it is assumed that data 150 of two service types (i.e., class-1 data 151 and class-2 data 153) with different QoS levels are generated for transmission to the receiver and provided to the encoder 111, and the class-1 data 151 is higher than the class-2 data 153 in QoS level.

Upon generation of the data 150, the data 150 is divided into the class-1 data 151 and the class-2 data 153. The encoder 111 encodes the class-1 data 151 and the class-2 data 153 in predetermined coding schemes according to their service types, that is, at different coding rates. The class-1 data 151 with a higher QoS level is encoded at a lower coding rate than the class-2 data 153 with a lower QoS level. For example, the class-2 data 153 is encoded at a coding rate of 1/2 and the class-1 data 151 at a coding rate of 1/3.

The puncturer 113 punctures the encoded data. The modulator 115 modulates the punctured data in a predetermined modulation scheme. The RF processor 117 processes the modulated data to an RF signal and transmits the RF signal to the receiver through an antenna (ANT).

Figure 2:
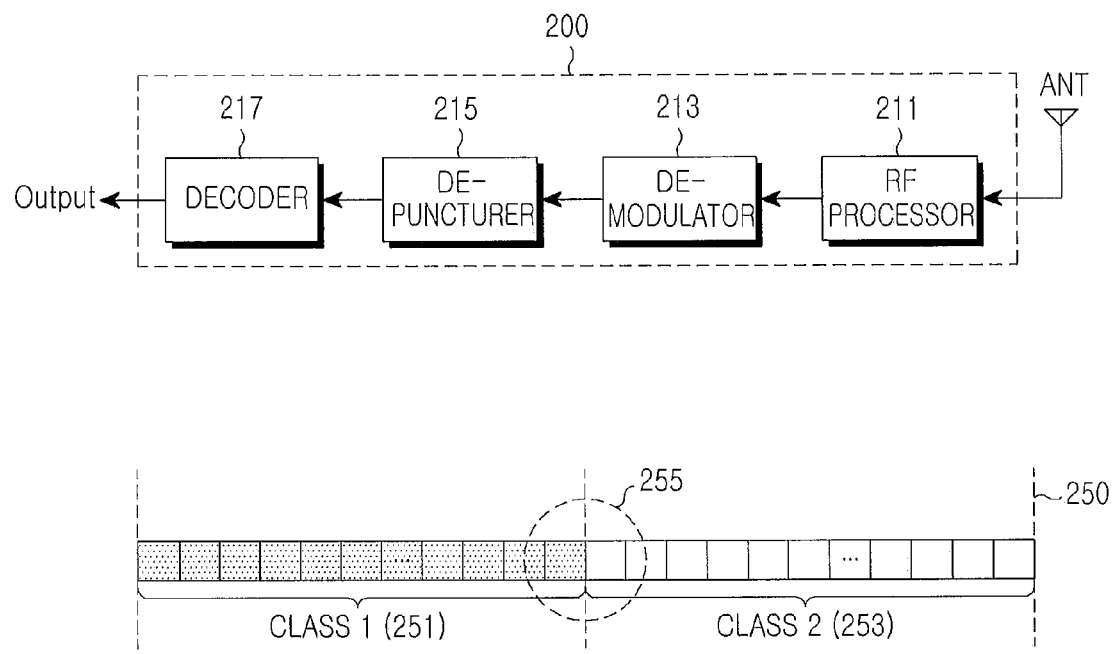
FIG. 2 is a block diagram of a receiver in the conventional communication system.

FIG. 2 is a block diagram of a receiver in the conventional communication system.

Referring to FIG. 2, a receiver 200 includes an RF processor 211 for RF-processing received data, a demodulator 213 for demodulating the processed data in a demodulation scheme corresponding to the modulation scheme used in the transmitter, a depuncturer 215 for depuncturing the demodulated data, and a decoder 217 for decoding the depunctured data in decoding schemes corresponding to the coding schemes used in the encoder 111.

In operation, the receiver 200 receives data from the transmitter 100 through an antenna (ANT). The RF processor 211 RF-processes the received data and the demodulator 213 demodulates the processed data in the demodulation scheme corresponding to the modulation scheme of the modulator 115 of the transmitter 100. The depuncturer 215 depunctures the demodulated data. The decoder 217 decodes the depunctured data by applying the decoding schemes corresponding to the coding schemes of the encoder 111 in the transmitter 100 (i.e., different coding rates for class-1 data 251 and class-2 data 253).

As the encoder 111 of the transmitter 100 encodes the class-2 data 153 at a higher coding rate than the class-1 data 151, for example, the class-2 data 153 at a coding rate of 1/2 and the class-1 data 151 at a coding rate of 1/3, the decoder 217 decodes the class-2 data 253 at a decoding rate corresponding to the coding rate of 1/2 and the class-1 data 251 at a decoding rate corresponding to the coding rate of 1/3.

The decoder 217 also decodes a boundary bit region 255 between the class-1 data 251 and the class-2 data 253 at the different decoding rates, thus degrading the decoding performance of the boundary bit region 255. That is, when the decoder 217 decodes the class-1 data 251 at the decoding rate corresponding to the coding rate of 1/3 and the class-2 data 253 at a decoding rate corresponding to the coding rate of 1/2, the different decoding rates affect the boundary bit region 255. Therefore, the decoding performance of the class-1 data 251 and the class-2 data 253 is degraded.

Figure 3:
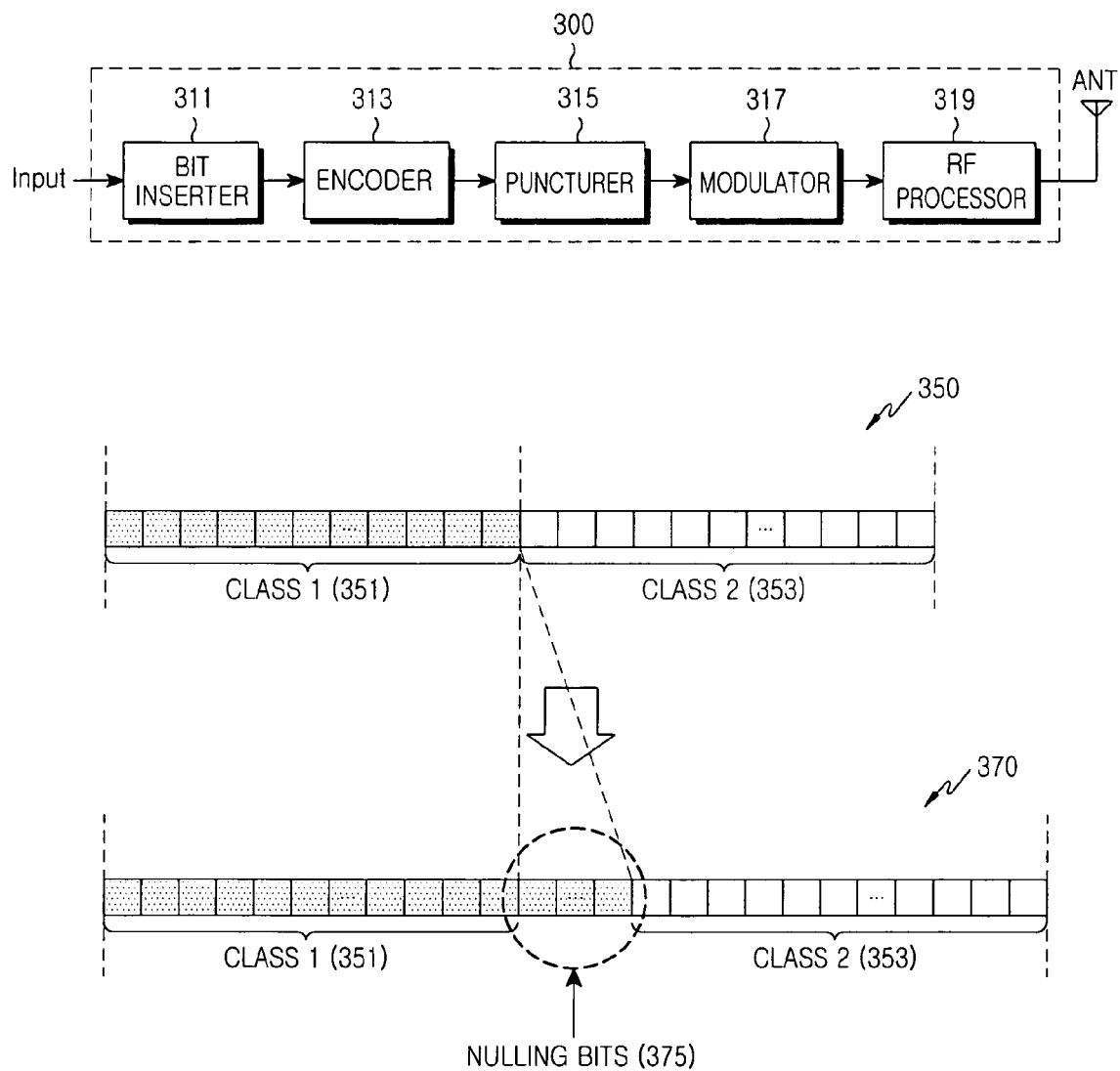
FIG. 3 is a block diagram of a transmitter in the communication system according to another exemplary embodiment of the present invention.

FIG. 3 is a block diagram of a transmitter in a communication system according to an exemplary embodiment of the present invention.

Referring to FIG. 3, a transmitter 300 includes a bit inserter 311 for inserting predetermined bits (i.e., a number of nulling bits) as a guard interval between data classified into different service types upon generation of transmission data for a receiver, an encoder 313 for encoding the data with the nulling bit, a puncturer 315 for puncturing the encoded data, a modulator 317 for modulating the punctured data, and an RF processor 319 for processing the modulated data to an RF signal for transmission to the receiver.

it is assumed that data 350 of two service types (i.e., class-1 data 351 and class-2 data 353) with different QoS levels are generated for transmission to the receiver and provided to the bit inserter 311, and the class-1 data 351 is higher than the class-2 data 353 in QoS level.

The transmitter 300 inserts a predetermined number of bits, for example, three nulling bits (Logic 0 bits) between the class-1 data 351 with a lower coding rate and the class-2 data 353 with a higher coding rate.

In operation, the data 350 classified into the class-1 data 351 and the class-2 data 353 are provided to the bit inserter 311. The bit inserter 311 inserts three nulling bits 375 between the class-1 data 351 and the class-2 data 353. The encoder 313 encodes the resulting data 370 with the nulling bits 375 in predetermined coding schemes according to the service types of the data, that is, at different coding rates for the class-1 data 351 and the class-2 data 353. The class-1 data 351 with a higher QoS level is encoded at a lower coding rate than the class-2 data 353 with a lower QoS level. For example, the class-2 data 353 is encoded at a coding rate of 1/2 and the class-1 data 351 at a coding rate of 1/3.

The puncturer 315 punctures the encoded data. The modulator 317 modulates the punctured data in a predetermined modulation scheme. The RF processor 319 processes the modulated data to an RF signal and transmits the RF signal to the receiver through an antenna (ANT).

Figure 4:
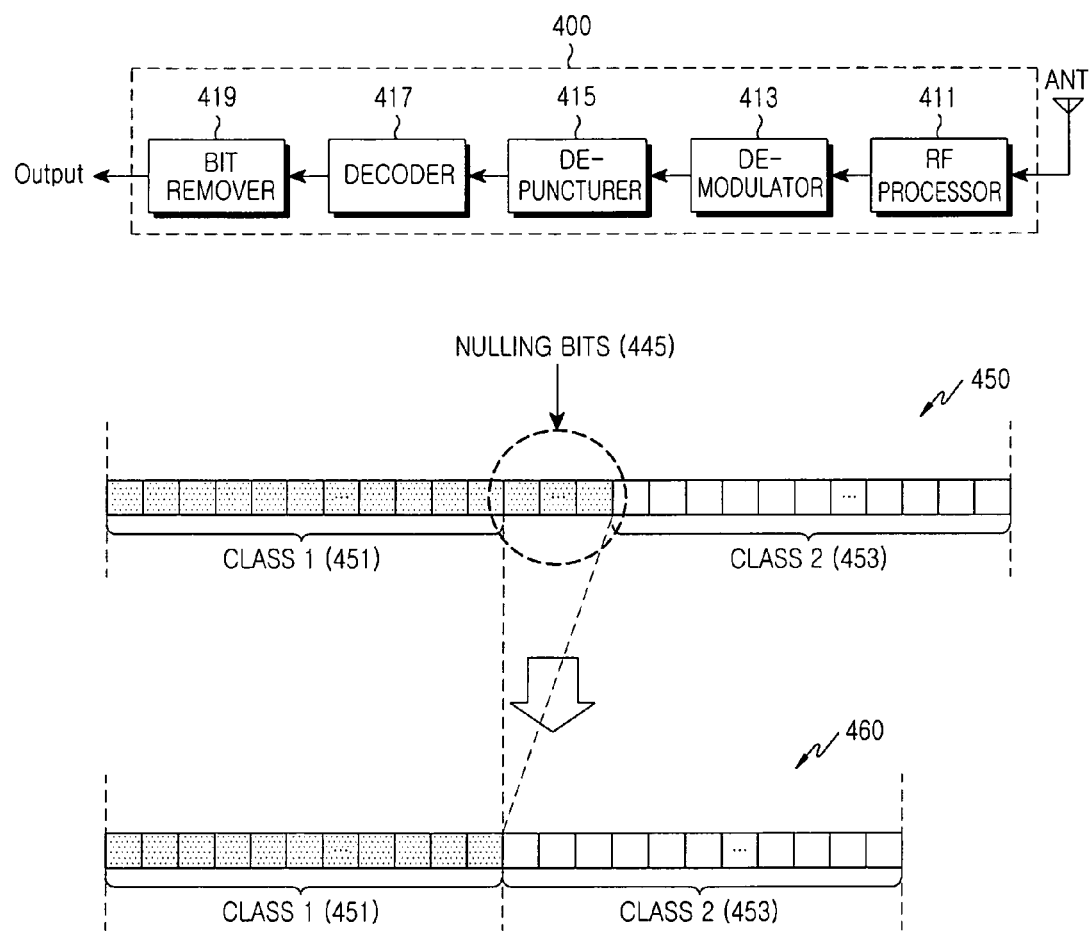
FIG. 4 is a block diagram of a receiver in the communication system according to another exemplary embodiment of the present invention.

FIG. 4 is a block diagram of a receiver in the communication system according to an exemplary embodiment of the present invention.

Referring to FIG. 4, a receiver 400 includes an RF processor 411 for RF-processing received data, a demodulator 413 for demodulating the processed data in a demodulation scheme corresponding to the modulation scheme used in the transmitter, a depuncturer 415 for depuncturing the demodulated data, a decoder 417 for decoding the depunctured data in decoding schemes corresponding to the coding schemes used in the encoder 411, and a bit remover 419 for eliminating nulling bits 445 inserted by the transmitter.

In operation, the receiver 400 receives data from the transmitter 300 through an antenna (ANT). The RF processor 411 RF-processes the received data and the demodulator 413 demodulates the processed data in the demodulation scheme corresponding to the modulation scheme of the modulator 317 of the transmitter 300. The depuncturer 415 depunctures the demodulated data. The decoder 417 decodes the depunctured data by applying the decoding schemes corresponding to the coding schemes of the encoder 313 in the transmitter 300 (i.e., different coding rates for class-1 data 451 and class-2 data 453).

As the encoder 313 of the transmitter 300 encodes the class-2 data 353 at a higher coding rate than the class-1 data 351, for example, the class-2 data 353 at a coding rate of 1/2 and the class-1 data 351 at a coding rate of 1/3, the decoder 417 decodes the class-2 data 453 at a decoding rate corresponding to the coding rate of 1/2 and the class-1 data 451 at a decoding rate corresponding to the coding rate of 1/3.

Due to the existence of the nulling bits 445 as a guarding interval between the class-1 data 451 and the class-2 data 453, the class-1 data 451 and the class-2 data 453 are not affected by the other data during decoding at the decoder 417. Therefore, the decoding performance of the class-1 data 451 and the class-2 data 453 is improved.

The bit remover 419 eliminates the nulling bits from between the class-1 data 451 and the class-2 data 453 in the data received from the decoder 417 and outputs the resulting decoded data 460 (i.e., the class-1 data 451 and the class-2 data 453).

As is apparent from the above description, the exemplary embodiments of the present invention can increase a data transmission and reception rate and thus stably provide communication services with various QoS requirements to users, since upon generation of data of communication services to be provided to a user, a transmitter classifies the data according to the types of the communication services, inserts a guard interval between the data of different service types, and transmits the data with the guard interval to a receiver.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting data in a transmitter in a communication system, comprising:
    classifying data to be transmitted to a receiver according to service types of communication services;
    inserting a guard interval between the classified data of the service types;
    encoding the classified data at different coding rates according to the service types and encoding the guard interval at one of the different coding rates; and
    transmitting the encoded data to the receiver.

2. The method of claim 1, wherein inserting the guard interval comprises inserting a predetermined number of nulling bits between the classified data.

3. The method of claim 2, wherein the nulling bits are 0s.

4. The method of claim 1, wherein the service type includes at least one of Unsolicited Granted Service (UGS) type, real time Polling Service (rtPS) type, non-real-time Polling Service (nrtPS) type, and Best Effort Service (BES) types.

5. A method for receiving data in a receiver in a communication system, comprising:
    receiving from a transmitter data including a guard interval inserted between the data classified according to different service types;
    decoding the classified data at different decoding rates according to the service types and decoding the guard interval at one of the different decoding rates; and
    eliminating the guard interval from the decoded data.

6. The method of claim 5, wherein eliminating the guard interval comprises eliminating a predetermined number of nulling bits.

7. The method of claim 5, wherein the service type includes at least one of Unsolicited Granted Service (UGS) type, real time Polling Service (rtPS) type, non-real-time Polling Service (nrtPS) type, and Best Effort Service (BES) types.

8. A system for transmitting and receiving data in a communication system, comprising:
    a transmitter for classifying data to be transmitted to a receiver according to service types of communication services, inserting a guard interval between the classified data encoding the classified data at different coding rates according to the service types, encoding the guard interval at one of the different coding rates, and transmitting encoded the data to the receiver; and
    the receiver for receiving the encoded data from the transmitter, decoding the classified data at different decoding rates according to the service types, decoding the guard interval at one of the different decoding rates, and eliminating the guard interval from the decoded data.

9. The system of claim 8, wherein the transmitter inserts a predetermined number of nulling bits between the classified data.

10. The system of claim 9, wherein the nulling bits are 0s.

11. The system of claim 8, wherein the transmitter classifies the data according to the service type classes of the communication services.

12. The system of claim 8, wherein the receiver eliminates a predetermined number of nulling bits.

* * * * *